Dec. 8, 1970   M. H. STANGER   3,545,980
COMBINATION STRAW AND FLAVORING
Filed Dec. 1, 1966

INVENTOR
MILDRED H. STANGER

United States Patent Office 3,545,980
Patented Dec. 8, 1970

3,545,980
COMBINATION STRAW AND FLAVORING
Mildred H. Stanger, 2118 Haybarger Road,
Erie, Pa. 16502
Filed Dec. 1, 1966, Ser. No. 598,475
Int. Cl. A23g *3/00*
U.S. Cl. 99—138                                         1 Claim

ABSTRACT OF THE DISCLOSURE

A straw for sipping a drink. A straw being made of a relatively long hollow member, having a piece of candy supported on the end that is to be received in the mouth of the drinker. The candy is in the shape of a tear-drop so that it can be comfortably received in the mouth of the drinker and the drink can be sipped through the straw while the candy engages the lips.

---

This invention relates to straws and more particularly to the combination of straws for sipping drinks and the like and a candy mouthpiece integrally connected therewith.

It is frequently desirable to have a variety of flavors added to the same drink to suit the individual taste of various persons who may consume it.

Applicant has discovered that by providing a candy mouthpiece on a straw that unusual combinations of flavors with standard drinks can be accomplished.

It is accordingly an object of the invention to provide an improved sipping straw.

Another object of the invention is to provide a sipping straw in combination with a piece of candy which is simple in construction, economical to manufacture, and is simple and desirable for use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
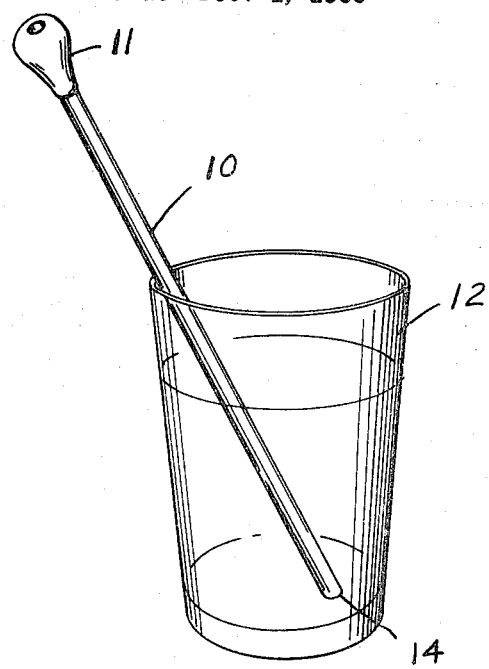
FIG. 1 is a view of the straw according to the invention supported in a glass.
Figure 2:
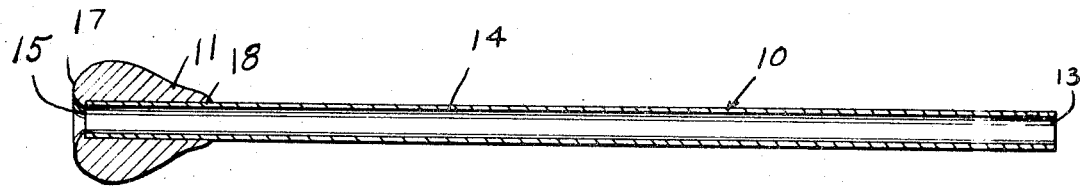
FIG. 2 is a longitudinal cross-sectional view of the straw and candy combination according to the invention.

Now with more particular reference to the drawings, the straw 10 is of a conventional type of straw that may be made of paper, plastic or the like.

It is shown supported in the glass 12 with the candy mouthpiece 11 thereon. The candy may be of lemon, orange, berry, or any other suitable flavor and it may be made of the consistency of the ordinary well known hard candies or any other suitable candy that will dissolve readily and relatively slowly in the saliva of the person sipping the straw.

The tip can also be made of medicinal material such as cough stopper or coughdrop.

The straw has a hollow 14 through it with an inlet 13 that will normally be supported at the bottom of the drinking glass and the exit end 15 adjacents the large rounded end 17 of the mouthpiece. The mouthpiece may be considered to be tear-drop shaped with the straw extending through the end and it will normally be formed by dipping the straw into the candy or spreading the candy around the end.

To use the straw, the straw will be placed in the glass as shown in FIG. 1 and the person desiring to drink through the straw will place the candy in his mouth with his lips over the part remote from the end of the tear-drop and will operate the straw in the conventional manner.

Figure 3:
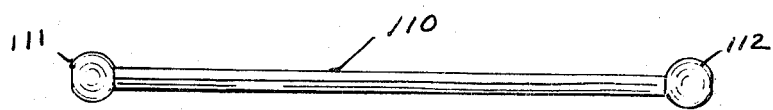
FIG. 3 is a view of another embodiment of the invention.

In the embodiment of the invention shown in FIG. 3, the straw 10 has a mouthpiece 111 on one end made of a first flavor of candy and a similar second piece of candy 112 fixed to the other end in a manner similar to the manner that the piece 11 is attached to the end of straw 10. One or both of the members 111 and 112 could be made of cough drop materials such as those commonly available.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

1. In combination a sipping straw and candy material fixed to one end and of a size to be held in the mouth of a person,
   said straw being made of an elongated, relatively thin, hollow body, extending substantially through the said candy material from end to end thereof with the end of said straw in said straw being open whereby liquid can be sipped through said straw inside said candy material,
   said candy being fixed to said straw at said end surrounding said straw and generally concentric to said hollow body,
   said candy being generally tear-drop in shape and said straw extending generally through the longer axis of said tear-drop.

References Cited

UNITED STATES PATENTS

| 1,500,047 | 7/1924 | Bias | 99—138.5 |
| 2,036,706 | 4/1936 | Law | 99—138.5 |
| 1,996,203 | 4/1935 | Hollingsworth | 99—138 |

FOREIGN PATENTS

| 279,758 | 1927 | Great Britain | 99—138 |

RAYMOND N. JONES, Primary Examiner